US011088757B2

(12) United States Patent
Agarwal et al.

(10) Patent No.: US 11,088,757 B2
(45) Date of Patent: Aug. 10, 2021

(54) HIGH-THROUGHPUT SATELLITE WITH SPARSE FIXED USER BEAM COVERAGE

(71) Applicant: VIASAT, INC., Carlsbad, CA (US)

(72) Inventors: Anil Agarwal, North Potomac, MD (US); Remberto Martin, Centennial, CO (US); Erwin Hudson, Rockcliffe Park, CO (US); Clifford Burdick, Vista, CA (US)

(73) Assignee: Viasat, Inc., Carlsbad, CA (US)

( * ) Notice: Subject to any disclaimer, the term of this patent is extended or adjusted under 35 U.S.C. 154(b) by 74 days.

(21) Appl. No.: 16/489,344

(22) PCT Filed: Mar. 15, 2018

(86) PCT No.: PCT/US2018/022766
§ 371 (c)(1),
(2) Date: Aug. 27, 2019

(87) PCT Pub. No.: WO2018/170342
PCT Pub. Date: Sep. 20, 2018

(65) Prior Publication Data
US 2020/0076497 A1 Mar. 5, 2020

Related U.S. Application Data

(60) Provisional application No. 62/472,093, filed on Mar. 16, 2017.

(51) Int. Cl.
*H04B 7/204* (2006.01)
*H04B 7/185* (2006.01)
*H04B 7/19* (2006.01)

(52) U.S. Cl.
CPC ....... *H04B 7/2041* (2013.01); *H04B 7/18513* (2013.01); *H04B 7/18515* (2013.01); *H04B 7/19* (2013.01)

(58) Field of Classification Search
CPC .................................................. H04B 7/2041
See application file for complete search history.

(56) References Cited

U.S. PATENT DOCUMENTS

| 4,188,578 A | 2/1980 | Reudink et al. | |
|---|---|---|---|
| 4,204,093 A * | 5/1980 | Yeh | H04B 7/2046 370/323 |

(Continued)

OTHER PUBLICATIONS

"Advanced Communications Technology Satellite (ACTS) Technology System Overview", retrieved on Jul. 27, 2012 at: http://acts.grc.nasa.gov/technology/index.shtml (2 pages).

(Continued)

*Primary Examiner* — Edan Orgad
*Assistant Examiner* — Won Tae C Kim
(74) *Attorney, Agent, or Firm* — Holland & Hart LLP (57) ABSTRACT

Embodiments provide high-throughput, hub-and-spoke satellite communications with geographically non-overlapping user beams and full frequency reuse. For example, a coverage area of a satellite is segmented into multiple candidate coverage zones, and an associated consumption demand is determined for each candidate coverage zone. Fixed spot beams are assigned to a subset of the candidate coverage zones according to highest associated consumption demands, such that each fixed spot beam corresponds to at least one candidate coverage zone to service an associated beam coverage area that is geographically non-overlapping with beam coverage areas of all other fixed spot beams, and each fixed spot beam is allocated full use of a same spectrum. One or more steerable beams selectively cover lower consumption demand zones.

26 Claims, 7 Drawing Sheets

(56) References Cited

U.S. PATENT DOCUMENTS

| | | | |
|---|---|---|---|
| 6,314,269 | B1 | 11/2001 | Hart et al. |
| 6,377,561 | B1 | 4/2002 | Black et al. |
| 6,653,975 | B2 | 11/2003 | Branscombe et al. |
| 6,665,518 | B1 | 12/2003 | Courtney et al. |
| 7,706,787 | B2 | 4/2010 | Malarky et al. |
| 8,326,217 | B2 | 12/2012 | Wahlberg et al. |
| 8,542,629 | B2 | 9/2013 | Miller |
| 8,705,436 | B2 | 4/2014 | Dutta et al. |
| 8,712,321 | B1 | 4/2014 | Dankberg |
| 8,744,344 | B2 | 6/2014 | Schiff et al. |
| 8,805,275 | B2 | 8/2014 | O'Neill et al. |
| 8,843,059 | B2 | 9/2014 | Roos et al. |
| 8,929,885 | B2 | 1/2015 | Park |
| 8,929,886 | B2 | 1/2015 | Park |
| 9,014,620 | B2 | 4/2015 | Dankberg |
| 9,118,455 | B2 | 8/2015 | Agarwal |
| 9,912,399 | B2 | 3/2018 | Dankberg |
| 2006/0045038 | A1 | 3/2006 | Kay et al. |
| 2012/0164941 | A1 | 6/2012 | Park |
| 2013/0154874 | A1 | 6/2013 | Burr |
| 2014/0038515 | A1 | 2/2014 | Avellan et al. |
| 2014/0065950 | A1 | 3/2014 | Mendelsohn et al. |
| 2014/0112241 | A1 | 4/2014 | Gayrard et al. |
| 2015/0229385 | A1 | 8/2015 | Roos |

OTHER PUBLICATIONS

"Advanced Communications Technology Satellite (ACTS) Technology Spacecraft", retrieved on Jul. 27, 2012 at: http://acts.grc.nasa.gov/technology/spacecraft/index.shtml (2 pages).

"Advanced Communications Technology Satellite (ACTS) Technology Spacecraft Specifications", retrieved on Jul. 27, 2012 at: http://acts.grc.nasa.gov/technology/spacecraft/specs.shtml (6 pages).

"Advanced Communications Technology Satellite (ACTS) Technology Spacecraft Multiple Hopping Beam Antennas", retrieved on Jul. 27, 2012 at: http://acts.grc.nasa.gov/technology/spacecraft/multihop.shtml (2 pages).

"Advanced Communications Technology Satellite—(ACTS) Technology Spacecraft Onboard Baseband Processing (BBP) and Switching", retrieved on Jul. 27, 2012 at: http://acts.grc.nasa.gov/technology/spacecraft/bbp.shtml (2 pages).

"Advanced Communications Technology Satellite (ACTS) Technology Spacecraft Microwave Switch Matrix (MSM)", retrieved on Jul. 27, 2012 at: http://acts.grc.nasa.gov/technology/spacecraft/msm.shtml (1 page).

"Advanced Communications Technology Satellite (ACTS) Technology Spacecraft Adaptive Rain Fade Compensation", retrieved on Jul. 27, 2012 at: http://acts.grc.nasa.gov/technology/spacecraft/rainfade.shtml (2 pages).

"Advanced Communications Technology Satellite (ACTS) Technology Earth Stations", retrieved on Jul. 27, 2012 at: http://acts.grc.nasa.gov/technology/earthstations/index.shtml (2 pages).

Choi, J.P., et al., "Optimum Power and Beam Allocation Based on Traffic Demands and Channel Conditions Over Satellite Downlinks", Lab for Inf. & Decision System, Massachusetts Institute of Technology, Cambridge, MA, USA—Published in: IEEE Transactions on Wireless Communications, 4(6): 2983-2993 (Nov. 2005).

De Baere, Tom, "The Future of High Throughput Satellites for Service Providers" Newtec Satcont Industry Blog, Sharing the Future of Satellite Communications (Nov. 27, 2013) (6 pages).

Gedney R.J., et al., Advanced Communications Technology Satellite (ACTS), NASA Lewis Research Center, pp. 1566-1577 (1989).

Gedney, R.J, et al., "ACTS Technology Description and Results" National Aeronautics and Space Administration, Prepared under Contract NAS3-23790, Glen Research Center, 158 pp. (Feb. 1, 2000).

Harris caprock.com, "Not All Bands are Created Equal: A Closer Look at Ka & Ku High Throughput Satellites", 2012 Harris CapRock Communications, Inc., pp: 1-11.

Hunter, Daryl, "Mobility Over Typical and High Throughput Spot-Beam Satellites", ITU Workshop on the Efficient Use of the Spectrum/Orbit Resource, Limassol, Cyprus, Apr. 14-16, 2014, pp. 1-13.

Krawcyk, R.I., et al., "The Advanced Communications Technology Satellite—Performance, Reliability and Lessons Learned" ACTS Conference 2000 Proceedings, pp. 175-184.

Lowry, et al., "Advanced Communications Technology Satellite, System Handbook" NASA TM-101490, Revisions Sep. 30, 1993 (126 pages).

Newsat, Global Satellite Solutions, "Not All KA-Band Satellites Are the Same" pp. 1-2 (Mar. 8, 2013).

Park, U., et al., "A Dynamic Bandwidth Allocation Scheme for a Multi-Spot-Beam Satellite System", ETRI Journal, 34(4): 613-616 (Aug. 2012) Willey Online Library.

Park, U., et al., "Optimum Selective Beam Allocation Scheme for Satellite Network with Multi-Spot Beams", SPACOMM 2012: The Fourth International Conference on Advances in Satellite and Space Communications, pp. 78-81.

PCT Notification Concerning Transmittal of International Preliminary Report on Patentability issued in PCT Application No. PCT/US2018/022766, dated Sep. 26, 2019, International Filing Date: Mar. 15, 2018, pp. 1-17.

International Application No. PCT/US2018/022766, International Search Report and Written Opinion dated Aug. 17, 2018, 21 pages.

International Application No. PCT/US2018/022766, Invitation to Pay Additional Fees and, Where Applicable, Protest Fee dated Jun. 5, 2018, 15 pages.

\* cited by examiner

HIGH-THROUGHPUT SATELLITE WITH SPARSE FIXED USER BEAM COVERAGE

FIELD

Embodiments relate generally to communications systems, and, more particularly, to providing high-throughput, hub-and-spoke satellite communications using sparse fixed user beam coverage and full frequency reuse.

BACKGROUND

In wireless communications systems, such as satellite communication systems, data can be communicated from one location to another via a wireless relay. For example, in a hub-and-spoke satellite communications system, data can be communicated between gateway terminals (e.g., satellite access nodes and user terminals via a satellite. It is generally desirable to increase throughput of the communications system. However, total throughput of a satellite can be limited in many cases by practical design constraints, such as weight budget, size budget, power budget, etc. For example, providing high capacity can involve using narrower spot beams, which can increase the number of beams needed to cover a large geographic region. Producing large numbers of beams with a satellite can involve adding large numbers of antenna elements, transponders, and the like; and/or adding complex beam switching and/or beamforming hardware. Further, producing narrowly focused beams can typically involve using larger reflectors. Practical weight, size, and power constraints can limit the amount of on-board hardware, the sizes of reflectors, etc.

To provide high throughput within such design constraints, various techniques have been developed. For example, some satellites use on-board hardware to hop or switch between beam patterns, or the like, to effectively allocate capacity by time-division multiplexing (e.g., using the same number of antenna elements and transponders to provide larger numbers of beams, though only some are illuminated at any given time). Other satellites use multiple color patterns, or the like, to effectively allocate capacity by frequency-division multiplexing. Still other satellites use beam steering (e.g., mechanical pointing, beamforming, etc.) to provide flexible coverage with fewer elements. And other satellites can use combinations of large and small beams and/or other techniques to distribute or allocate capacity. However, each of the above and other approaches tend to involve adding complex hardware (e.g., beamformers, switches, etc.), adding reflectors, and/or otherwise adding to the complexity, size, and or weight of the satellite. For these and other reasons, conventional approaches have tended not to be practical for providing coverage across large geographic areas with very high throughput (e.g., on the order of one Terabit per second).

BRIEF SUMMARY

Among other things, systems and methods are described for providing high-throughput, hub-and-spoke satellite communications with geographically non-overlapping user beams and full frequency reuse. For example, a coverage area of a satellite is segmented into multiple candidate coverage zones, and an associated consumption demand is determined for each candidate coverage zone. Fixed spot beams are assigned to a subset of the candidate coverage zones according to highest associated consumption demands, such that each fixed spot beam corresponds to at least one candidate coverage zone to service an associated beam coverage area that is geographically non-overlapping with beam coverage areas of all the other fixed spot beams, and each fixed spot beam is allocated full use of a same user-link spectrum. One or more steerable beams (e.g., using a phase array, mechanical beam steering, etc.) can selectively cover other candidate coverage zones, (e.g., lower consumption demand zones).

BRIEF DESCRIPTION OF THE DRAWINGS

The present disclosure is described in conjunction with the appended figures.

In the appended figures, similar components and/or features can have the same reference label. Further, various components of the same type can be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are set forth to provide a thorough understanding of the present invention. However, one having ordinary skill in the art should recognize that the invention can be practiced without these specific details. In some instances, circuits, structures, and techniques have not been shown in detail to avoid obscuring the present invention.

In satellite communications systems, it is generally desirable to increase capacity (e.g., bandwidth). Conventional approaches attempt to provide contiguous coverage over large areas by using various techniques, such as increased power, increased number of beams, increased frequency reuse, etc. However, such approaches typically become impractical for servicing large regions (e.g., continental United States, or CONUS) with very high throughput (e.g., around one Terabit). Accordingly, some embodiments described herein intend to provide high-throughput (though potentially sparse) coverage across a large geographic area by focusing on population centers. For example, implementations can sacrifice coverage, flexibility, and other features of other satellite communications systems, in exchange for higher throughput to regions having higher consumption demand.

Figure 1:
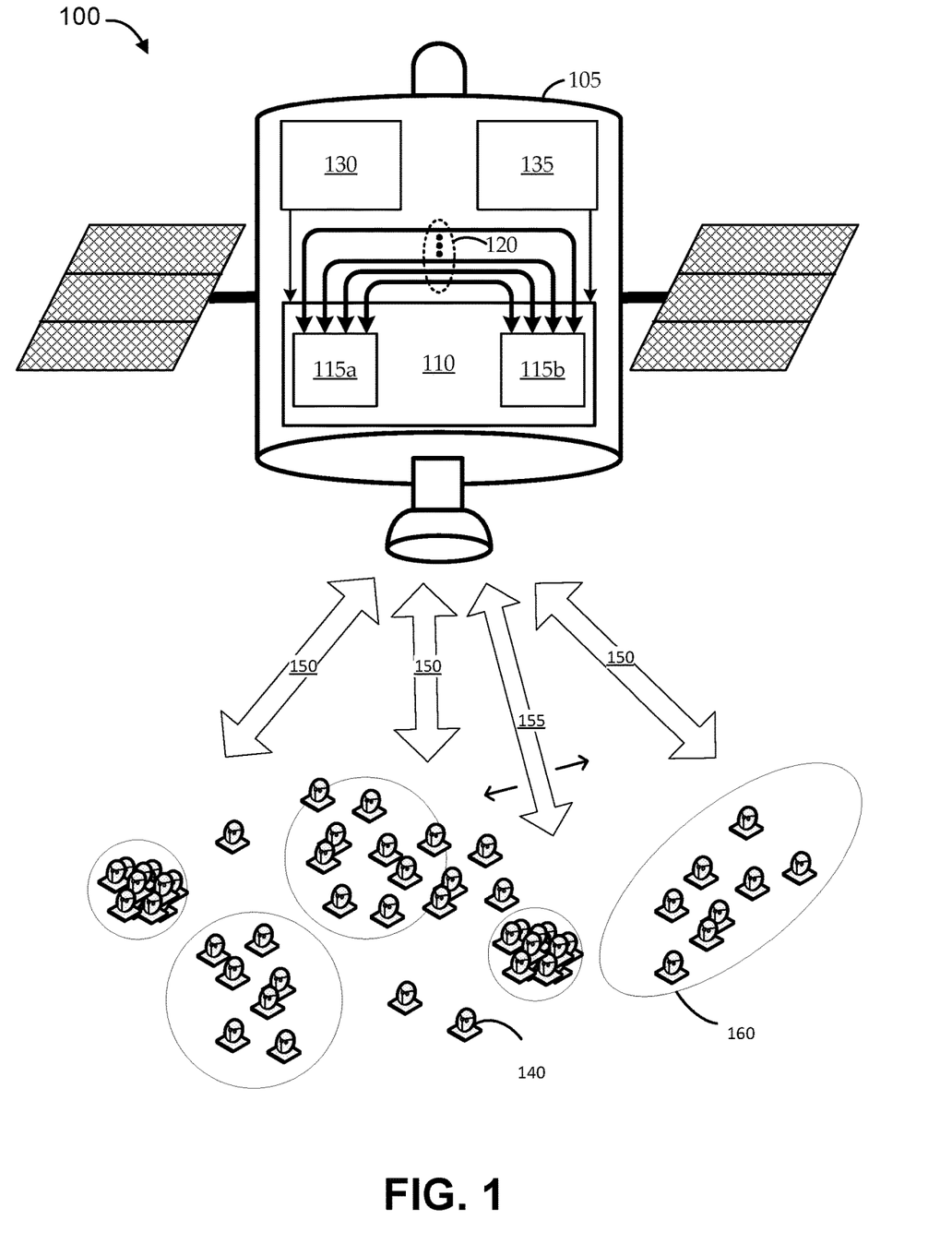
FIG. 1 shows an illustrative satellite communications system for providing high-throughput communications, according to various embodiments.

Turning to FIG. 1, an illustrative satellite communications system 100 is shown for providing high-throughput communications, according to various embodiments. As shown, the communications system 100 includes a geostationary satellite 105. In some embodiments, the satellite 105 is a bent-pipe satellite. Embodiments of the satellite 105 provide communications between ground terminals 140, which can include gateway terminals and user terminals. The satellite 105 and ground terminals 140 can implement a hub-and-spoke communications architecture, whereby user terminals communicate with each other and with other communications networks through gateway terminals. For example, forward communications are from gateway terminals to user terminals via the satellite 105, and return communications are from user terminals to gateway terminals via the satellite 105.

The satellite 105 can communicate with the ground terminals 140 by illuminating beam coverage areas 160 with spot beams 150, 155. As described herein, some or all of the spot beams can be fixed spot beams 150 that illuminate fixed spot beam coverage areas. Some embodiments assign the spot beams, so that each fixed spot beam 150 illuminates a corresponding beam coverage area 160 that is geographically non-overlapping with all other beam coverage areas 160 of fixed spot beams 150. In some embodiments, each fixed spot beam 150 that is a fixed user beam (discussed below) illuminates a corresponding user beam coverage area 160 that is geographically non-overlapping with the user beam coverage areas 160 of all other fixed user beams. In some embodiments, each fixed spot beam 150 that is a fixed feeder beam (discussed below) illuminates a corresponding feeder beam coverage area that is geographically non-overlapping with the feeder beam coverage areas 160 of all other fixed feeder beams. Other implementations can do both of the foregoing. The beam coverage area 160 can be defined in any suitable manner. Generally, a beam coverage area is elliptical (which includes the special case of circular which is an ellipse with an eccentricity of zero), although other shapes can occur depending on factors such as: beam center relative to satellite slot, azimuth and elevation offset of the satellite antenna, proximity of beam coverage area to edge of satellite coverage area, cross-sectional shape of satellite antenna beam, etc. In some cases, the beam coverage area 160 is defined as the terrestrial surface area illuminated by the spot beam 150, 155 with at least 3 dB of peak signal strength. In some implementations, each fixed spot beam 150 has a 3 dB beamwidth between about 0.1 and 0.2 degrees (according to a two-dimensional "Az/El" coordinate system projected on a geographic area to represent azimuth and elevation angles relative to the satellite 105). In some embodiments, the coverage area of the satellite 105 may be illuminated by 80 to 100 non-overlapping, fixed spot beams 150 (e.g., some implementations can illuminate each beam coverage area 160 with two polarization orientations. Other implementations can do both of the foregoing so that there would effectively be 160-200 fixed spot beams). In some embodiments, two beam coverage areas 160 are considered as non-overlapping when their respective 3 dB beamwidths are non-overlapping. In other embodiments, overlap is considered more conservatively. For example, two beam coverage areas 160 are considered as non-overlapping only when their respective 4 dB beamwidths are non-overlapping, so that the 3 dB beamwidths are spaced further apart. In some embodiments, two beam coverage areas 160 are considered non-overlapping when the beams do not produce unacceptable interference with one another.

With no overlap between beam coverage areas, of the fixed spot beams 150, each fixed spot beam 150 can be allocated full use of a same user-link spectrum (e.g., a frequency band) at up to a same full transmission power without causing interference. In some implementations, allocating full use of the same user-link spectrum to each of the fixed spot beams 150 refers to downlink transmissions from the satellite to user terminals that use the same spectrum (e.g., 17.7 to 21.2 GHz) in each fixed spot beam 150. In some implementations, allocating full use of the same user-link spectrum to each of the fixed spot beams 150 refers to uplink transmissions from user terminals in each fixed spot beam 150 to the satellite that use the same spectrum (e.g., 27.5 to 31.0 GHz) as user terminals in the other fixed spot beams 150. Other implementations can do both of the foregoing. In some implementations, each fixed spot beam 150 is allocated user-link bandwidth that is any of 500 MHz, 900 MHz, 1.4 GHz, 1.5 GHz, 1.9 GHz, 2.4 GHz, 2.5 GHz, or 3.5 GHz. In other implementations, each fixed spot beam 150 is allocated a same bandwidth that is (or is in) the Ka band. As described herein, embodiments can provide an aggregate capacity across all the fixed spot beams 150 of at least 700 Gigabits per second for a modulation format achieving 2 bits per second per Hertz. In some implementations, the aggregate capacity across all the fixed spot beams 150 is at least one Terabit per second for a modulation format achieving 3 bits per second per Hertz.

The satellite 105 includes an antenna system 110 to produce the spot beams 150, 155. Embodiments of the antenna system 110 include transmit and receive antenna elements 115. The antenna elements 115 can include feed horns or any other suitable antenna component. For example, a single antenna element 115 can be implemented as a group of feeds (e.g., for contouring a beam). A single feed can include multiple feed ports (e.g., for transmit and receive, for multiple polarization orientations, etc.). In some implementations, the antenna system 110 includes one or more reflectors, actuators, and/or other elements for beam production (e.g., for focusing, pointing, shaping, etc.). The antenna system 110 can include multiple transponders 120. In some implementations, the transponders 120 are bent-pipe transponders (i.e., they do not demodulate, process, and re-modulate the signals). Each transponder 120 can have an input side coupled with a receive antenna element 115 and an output coupled with a transmit antenna element 115. Though not shown, each transponder 120 can include any suitable components for communicating signals between the receive and transmit antenna elements 115. For example, each transponder 120 can include a low-noise amplifier (LNA), frequency converter, and power amplifier (PA). Some implementations can further include components for adjusting polarization orientation, phase, amplitude, etc.

In some implementations, there is a one-to-one correspondence, so that each receive antenna element 115 is coupled with a corresponding one (and only one) transmit antenna element 115 via a corresponding one (and only one) transponder 120. In some embodiments, a receive antenna element 115 and a transmit antenna element 115 can be packaged together as a single antenna element 115 (e.g., a single feed horn with multiple ports). Further, in some embodiments, a single antenna element 115 can include four or more ports (e.g., a right hand circular polarization (RHCP) receive port, a left hand circular polarization (LHCP) receive port, a RHCP transmit port, and a LHCP transmit port). In these and other embodiments, though implemented as a single physical package, each port can be considered as a separate antenna element 115. For example, the one-to-one correspondence described above can be implemented by coupling each receive port of each antenna element 115 with a corresponding single transmit port of another antenna element 115 via a single transponder 120.

Across a satellite coverage area (e.g., the contiguous United States), different regions can be associated with different amounts of demand for consumption of satellite communications resources, generally referred to herein as "consumption demand." For example, densely populated areas are likely to consume larger amounts of streaming media, Internet services, and/or other services that use bandwidth and other communications infrastructure resources. As such, satisfying the consumption demand of a particular geographic region can involve providing sufficient resource capacity to the geographic region. In some cases, some of the consumption demand of a particular geographic region is already being satisfied by resources of one or more communications service providers, and only a portion of the consumption demand remains presently unserved. In some embodiments, the satellite 105 is designed so that fixed spot beams 150 illuminate coverage areas 160 that maximize one or more predetermined criteria, such as consumption demand, or presently unserved consumption demand. For example, for an infrastructure provider that already provides coverage to certain regions using existing infrastructure (or that plans to provide coverage to certain regions using different future infrastructure), the consumption demand computation can account for such existing and/or planned coverage as "presently served," such that the fixed spot beams 150 can be directed to the presently unserved areas. Some implementations account for additional characteristics in the consumption demand computation. For example, some implementations seek to target regions presently covered (or not covered) by one or more particular competitors or competing services. For example, it can be instructive to determine where a particular competitor has stopped advertising, which can indicate that the competitor has no further capacity to sell in that area; and to target such areas. Any other suitable indications of present and/or future consumption demand can be included in the computation, such as changes in population size, demographics, density, etc. Some implementations include additional metrics in the computation, such as geographic diversity (e.g., a spot beam 150 may be fixed on a particular region, even though it has a lower predicted consumption demand than other regions, because the region is far from other covered regions and supports an appearance of broader coverage).

Implementations can segment a coverage area (e.g., CONUS) of the satellite 105 into multiple candidate coverage zones. For example, candidate coverage zones can be defined in a level of granularity dictated, at least in part, by the granularity at which consumption demand data is available (by measurement, usage data, statistical analysis, survey data, etc.). In some cases, hundreds or thousands of candidate coverage zones are defined across a large geographic coverage area of the satellite, each defined by one or more of geographical boundaries, political boundaries (e.g., county, district, municipality, country, etc.), sales territory boundaries, existing coverage areas (e.g., of satellite spot beams, cells, etc.), and/or any other suitable boundary. In some implementations, some or all of the coverage area of the satellite 105 is segmented into equally sized candidate coverage zones (e.g., equal with respect to geographic area, population, predicted consumption demand, unserved consumption demand, population of potential customers, etc.). In some embodiments, the coverage area of the satellite 105 is substantially coextensive with an aggregate of the candidate coverage zones (e.g., the aggregate of all candidate coverage zones precisely, or approximately, covers the same region as that of the satellite 105 coverage area). A consumption demand can be determined in association with each (e.g., some or all) candidate coverage zone. For example, historical data, predictive algorithms, and/or the like can be used to determine present and/or future demand for communications infrastructure resources (e.g., bandwidth). In some cases, the determination is corrected for already served demand. For example, some determinations may only account for consumption demand that is presently unserved, presently unserved by satellite, presently unserved by a particular one or more providers, predicted to be unserved at some future time, etc. As one example, the satellite 105 can be a first satellite, and one or more of the candidate coverage zones can already be serviced (or predicted to be serviced) by a second satellite; and determining the consumption demand associated with the at least one candidate coverage zone can include determining a remaining consumption demand not already serviced by the second satellite.

The fixed spot beams 150 can be assigned to a subset of the candidate coverage zones (also referred to herein as a "first subset") according to highest associated consumption demands, such that each fixed spot beam 150 corresponds to at least one candidate coverage zone to service an associated beam coverage area 160. For example, a coverage area of the satellite 105 can include a few thousand candidate coverage zones, and only around 10 percent (e.g., a few hundred) of the candidate coverage zones may be illuminated with fewer than 100 geographically non-overlapping spot beams 150; but the illuminated 10 percent can potentially service the vast majority (e.g., 80-90 percent) of the predicted consumption demand of the satellite 105 coverage area.

As an example, it is typical in geographic regions for the vast majority of people in the region to live in its major metropolitan areas, and that the major metropolitan areas represent a relatively small portion of the total geography of the region. For example, according to official 2010 census data, over 70 percent of the population of the contiguous United States (CONUS) lives in "urbanized" areas (having more than 50,000 people), and those urbanized areas only account for around 2.5 percent of the geographic area. In an illustrative implementation, as described more fully below, a satellite can have an antenna that illuminates 85 fixed spot beams, each having a 3 dB beamwidth of between about 0.1 and 0.2 degrees. Around 400 such beams would be needed to provide full, contiguous coverage of the entire CONUS, but the satellite is implemented instead to provide geographically non-overlapping (e.g., sparse) coverage only of select areas (e.g., those determined with high certainty to have high consumption demand). Because of the geographic separation between beams, each spot beam can be allocated full use of a same spectrum (e.g., e.g., 1.5-2 GHz of Ka band spectrum). Using dual polarity, the satellite can effectively illuminate 170 spot beams, each having 1.5-2 GHz of spectrum. Assuming a throughput of 3 bits per second per Hertz yields approximately 10 Gigabits per beam, which may be closer to 6-7 Gigabits per beam after some practical losses. At 6 Gigabits for each of 170 beams, the total throughput of the satellite can be more than a Terabit.

Embodiments of the antenna system 110 include, or are in communication with, a power system 130. The power system 130 can include any suitable elements for powering components of the satellite 105, such as power storage components (e.g., batteries), power generating or harvesting components (e.g., solar panels), etc. The power system 130 can be used to provide power to LNAs coupled with receive antenna elements 115, PAs coupled with transmit antenna elements 115, attitude control and/or other propulsion components for the satellite 105, etc. In general, satellites are designed with a particular power budget, and the power system 130 is designed to supply at least the designed power budget of the satellite 105. The power budget can typically be limited by design constraints, such as weight budget (e.g., the maximum weight allowed for the satellite 105, for example, constrained by launch vehicle capacity, and/or other factors), regulatory specifications (e.g., maximum transmission power permitted at certain frequency bands by government and/or other regulation), power ratings of components (e.g., including power and/or heat ratings), etc.

In some implementations, each fixed spot beam 150 is associated with a beam output power to service the associated beam coverage area 160, so that an aggregate of all the associated beam powers are supportable by a predetermined total power of the satellite 105. For example, as described above, the power system 130 can supply a certain maximum amount of power, and some portion of that power can be allocated to production (e.g., illumination) of spot beams 150. Generally, a certain amount of beam output power scales, according to efficiency and/or other factors, to a raw satellite 105 power usage (e.g., DC power). For example, total power consumption of the satellite 105 can include power consumed by overhead operations of the satellite 105 (e.g., power used for telemetry, tracking, and command (TT&C) functions, attitude control, etc.), power consumed by the transponders (e.g., an aggregate of the power consumed by each transponder, which is typically independent of beam output power), and power consumed to output beams (e.g., typically, generating one Watt of beam output power can consume more than one Watt of DC power, due to non-ideal amplifier efficiency). Accordingly, the total power of the satellite 105, after accounting for overhead power, transponder power, amplifier efficiency, and/or other considerations, can correspond to a maximum supportable amount of beam output power. The supportable amount of beam output power can be distributed in any suitable manner to provide at least a particular number of beams, each with at least a particular beam output power. For example, the distribution can provide a larger number of beams, each with a smaller associated beam output power; a smaller number of beams, each with a larger associated beam output power; different beams, each with a different respective beam output power; etc.

As described herein, embodiments can focus fixed spot beam coverage only on those regions that maximize one or more predetermined criteria, such as served consumption demand (or served consumption demand that is presently unserved). Some embodiments assign fixed spot beams to maximize a served consumption demand per serving power. Each spot beam 150 can be allocated an amount of power (e.g., a same power per beam), and the power is distributed over the illuminated coverage area 160 of the spot beam 150 to service the one or more candidate coverage zones covered by the coverage area 160. For example, a same beam power can service different amounts of consumption demand based on the respective consumption demands of the candidate coverage zones in the beam coverage area 160, because of potential differences between sizes and/or densities of coverage areas 160 (e.g., coverage areas 160 can inherently have different sizes and shapes due to their terrestrial position relative to the satellite, and/or coverage areas 160 can be shaped using one or more techniques) and candidate coverage zones (e.g., zones can be defined to have the same or different sizes and/or shapes), and/or for other reasons. In some cases, the served consumption demand per serving power can be computed in served bits per second per Watt. For example, different potential spot beam 150 allocations can be evaluated to maximize served consumption demand per serving power by computing, for each layout, the predicted number of served bits per second of demand by consumers in the coverage area 160 for every Watt of power used by the satellite 105 to illuminate the coverage area 160.

Some embodiments of the antenna system 110 further include, or are in communication with, a beam steering system 135. The beam steering system 135 can be used to steer one or more of the spot beams as a steerable spot beam 155. For example, some implementations steer one or more spot beams 155 by mechanically repointing antenna elements that produce the steerable spot beam(s) 155, and other implementations steer one or more spot beams 155 by using beamforming, or the like, to digitally repoint the beam. The one or more steerable spot beams 155 effectively illuminates a repositionable coverage area 160 to selectively cover a subset of the candidate coverage zones (also referred to herein as a "second subset"). The second subset of the candidate coverage zones covered by the one or more sterrable spot beams 155, as compared to the first subset of the candidate coverage zones covered by the fixed spot beams 150, can vary from embodiment to embodiment. In some embodiments, one or more steerable spot beams 155 are pointable to cover at least one candidate coverage zone also covered by a fixed spot beam 150. In other words, at least one of the candidate coverage zones is within the first subset and within the second subset. In doing so, the steerable spot beam(s) 155 can be used selectively add capacity to one or more candidate coverage zones that can have highly dynamic consumption demand (e.g., the site of a large sporting event). In some embodiments, the one or more steerable spot beams 155 are pointable only to cover candidate coverage zones not covered by any of the fixed spot beams 150. In other words, the first subset and the second subset are disjoint. In doing so, the one or more steerable spot beams 155 can add flexibility to cover areas not originally predicted to have high consumption demand. This can be achieved for example by all the one or more steerable spot beams 155 having beam coverage areas 160 non-overlapping with the beam coverage areas 160 of all the fixed spot beams 150. In some implementations, one or more steerable spot beams 155 are pointable only to cover candidate coverage zones that are also covered by the fixed spot beams 150. For example, the one or more steerable spot beams 155 may only cover some of the candidate coverage zones also covered by the fixed spot beams 150, and not cover any candidate coverage zones not covered by the fixed spot beams 150. In such a case, the second subset covered by the one or more steerable spot beams 155 is a subset of the first subset covered by the fixed spot beams 150. In some implementations, determining the consumption demand includes computing a demand certainty score associated with each candidate coverage zone. For example, for each candidate coverage zone, consumption demand is predicted, along with a score indicating the magnitude of predicted consumption demand and the certainty of the prediction (e.g., based on fluctuations over time, changes in population size and/or demographics in the region, etc.). In such implementations, some or all fixed spot beams 150 can be assigned to the first subset of the candidate coverage zones having associated demand certainty scores exceeding a score threshold, the steerable spot beam(s) 155 are assigned to selectively cover the second subset of the candidate coverage zones having associated demand certainty scores below the score threshold. For example, some regions can have high scores indicating high demand with high certainty; other regions can have low scores indicating low demand and/or low certainty; and other regions can have scores indicating low certainty of high demand, insufficient certainty of high or low demand, etc. In some embodiments, the score threshold is set to produce a particular number of fixed spot beams 150. In other embodiments, the score threshold is set to result in assigning a predetermined ratio of fixed spot beams 150 to steerable spot beams 155.

In some embodiments, one or more fixed spot beams 150 is configured as a loopback beam. For example, a gateway terminal can be within a user terminal coverage area 160, such that the fixed spot beam 150 is both a feeder and user beam, and the gateway terminal can service user terminals in its own beam via the satellite 105. Some implementations use interference mitigation techniques to avoid interference between gateway terminal communications and user terminal communications in the same beam coverage area 160. In some implementations, the gateway terminal in the loopback beam communicates in a first frequency band, and user terminals in the same beam coverage area communicate in a second frequency band (i.e., a same user-link spectrum reused in each spot beam). For example, the first frequency band can be in the V band, and the second frequency band can be in the Ka band. In other implementations, the gateway terminal and user terminals in a same beam coverage area 160 can use different polarization orientations, different communication timing, and/or other interference mitigation techniques. For example, in one implementation, the gateway terminal and the multiple user terminals in the same beam coverage area 160 communicate in a same frequency band according to a paired carrier multiple access protocol; and in another implementation, the gateway terminal and the multiple user terminals in the same beam coverage area 160 communicate in a same frequency band according to a multiplexed channel sharing protocol.

Figure 2:
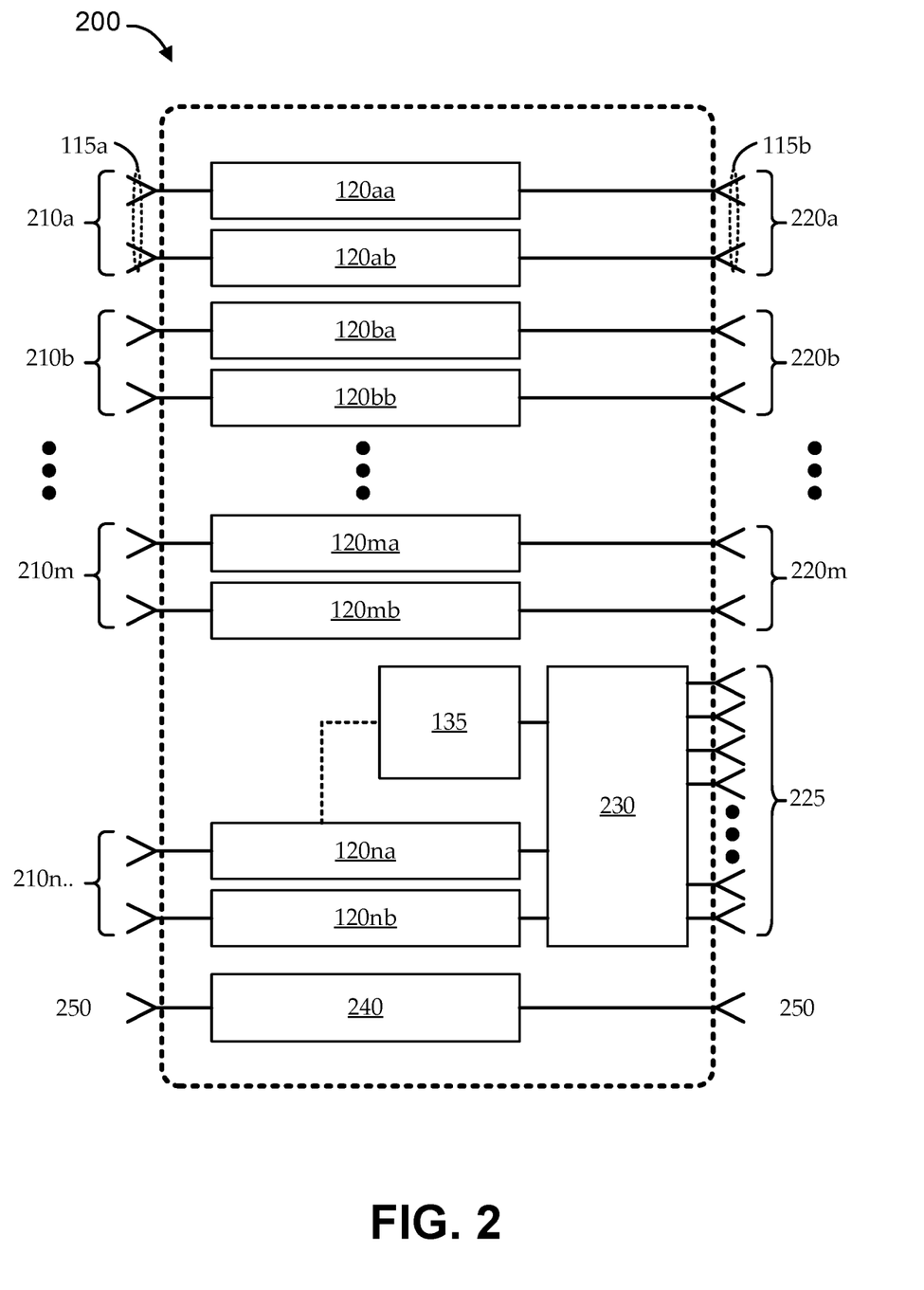
FIG. 2 shows a block diagram of an illustrative antenna system, according to various embodiments.

FIG. 2 shows a block diagram of an illustrative antenna system 200, according to various embodiments. The antenna system 200 can be an implementation of the antenna system 110 of FIG. 1. As illustrated, the antenna system 200 includes a number of feeds that can operate to produce fixed feeder beams 210 and fixed user beams 220, which can be the fixed spot beams 150 of FIG. 1. Some embodiments can further produce one or more steerable user beams 225, which can be the steerable beam(s) 155 of FIG. 1. Some embodiments can further produce one or more loopback beams 250, such that the fixed spot beam is both a feeder and user beam, and the gateway terminal can service user terminals in its own beam via the satellite.

The antenna system 200 can include multiple transponders 120, which can be implementations of transponders 120 of FIG. 1. In some embodiments, a fixed feeder beam 210 can be in forward-link communication with a fixed user beam 220 via a forward transponder 120a, and a fixed user beam 220 can be in return-link communication with a fixed feeder beam 210 via a return transponder 120b. For example, in forward-link communications, a gateway terminal illuminated by fixed feeder beam 210a can transmit a forward signal on a forward uplink to a receive port of antenna element 115a. The forward signal can be communicated via forward transponder 120aa (e.g., amplified, frequency-converted, etc.) to a transmit port of antenna element 115b for downlink transmission to one or more user terminals in the coverage area of fixed user beam 220a. In return-link communications, user terminals illuminated by fixed user beam 210b can transmit a return signal on a return uplink to a receive port of antenna element 115b. The return signal can be communicated via return transponder 120ba (e.g., amplified, frequency-converted, etc.) to a transmit port of antenna element 115a for downlink transmission to a gateway terminal in the coverage area of fixed feeder beam 210a. In some implementations, each fixed feeder beam 210 can be allocated full use of a same feeder-link spectrum (e.g., a frequency band) at up to a same full transmission power without causing interference. In some implementations, allocating full use of the same feeder-link spectrum to each of the fixed feeder beams 210 refers to downlink transmissions from the satellite that use the same spectrum (e.g., 17.7 to 21.2 GHz) in each fixed feeder beam 210. In some implementations, allocating full use of the same feeder-link spectrum to each of the fixed feeder beams 210 refers to uplink transmissions from gateway terminals associated with each fixed feeder beam 210 that use the same spectrum (e.g., 27.5 to 31.0 GHz) as the other fixed feeder beams 210. Other implementations can do both of the foregoing.

In some embodiments, one or more sets of transponders 120 can be coupled with one or more steerable antenna(s) 230. The steerable antenna(s) 230 can be controllably pointable by the beam steering subsystem 135 to an associated number of user beam coverage areas. For example, the associated user beam coverage areas can include at least one candidate coverage zone that is segmented from the coverage area of the satellite and is outside the beam coverage areas of all the fixed spot beam antenna elements. Some embodiments of the steerable antenna(s) 230 include a phased array of antenna elements 115. For example, the beam steering subsystem 135 can include a beam weights output, and the phased array of antenna elements can be controllably pointable according to the beam weights output. In some implementations, beam weights can be communicated from one or more gateway terminals and received (e.g., via a forward transponder 120na) by the beam steering subsystem 135. The beam weights can be applied to forward and/or return signals to enable beamforming by the phased array. In other embodiments the steerable antenna(s) 230 can include one or more mechanically steerable antenna elements 115. For example, the beam steering subsystem 135 can include a steering driver output, and the at least one mechanically steerable antenna element 115 can be controllably pointable according to the steering driver output. Embodiments can permit the steering driver output to be controllable by one or more ground terminals, for example, by receiving steering driver commands via one or more fixed feeder beams 210. Other embodiments can provide beam steering functionality in any suitable manner. While the antenna system 200 is shown as having steerable beam functionality only on the user beam side, some embodiments can, alternatively or additionally, provide steerable feeder beams. For example, steerable feeder beams can be implemented in a similar manner and can be used to load balance by selectively directing particular user beam traffic through particular gateway terminals, to shift capacity to new gateway terminals as they are deployed in an expanding network, to provide alternative gateway coverage during gateway outages, and/or for other reasons.

In some embodiments, one or more transponders can be loopback transponders 240 to enable loopback communications via one or more loopback beams 250. For example, the loopback beam(s) 250 can be one or more of the fixed spot beams having both a gateway terminal and user terminals, where the gateway terminal services the user terminals in its own spot beam. For example, a forward signal can be transmitted by a gateway terminal illuminated by the loopback beam 250 to a receive port of an antenna element 115, communicated via the loopback transponder 240 to a transmit port of the same antenna element 115 (or a different antenna element illuminating the same loopback beam 250 coverage area), and transmitted to one or more user terminals in the loopback beam 250 coverage area. Return-link communications can be handled similarly. As described above, geographic separation of the fixed user beams can enable full allocation of a same user-link spectrum to each beam without substantial interference (e.g., signal to noise degradation of less than 1 dB, less than 0.5 dB, less than 0.1 dB, etc.). However, when gateway terminals are deployed in user beam coverage areas (e.g., for loopback communications and/or for non-loopback communications), embodiments can include various interference mitigation techniques. In some implementations, interference between gateway and user terminals is mitigated or eliminated by using different frequency bands for feeder-link and user-link communications. Gateway terminals in a loopback beam 250 (e.g., or all gateway terminals in all beams) can communicate in V band, while user terminals in the loopback beam 250 (e.g., or all user terminals) can communicate in Ka band. In other implementations, gateway terminals and user terminals that share a beam coverage area 160 can use different polarization orientations, different communication timing (e.g., time-division duplex), different frequency subbands (e.g., frequency-division duplex), and/or other techniques to avoid or mitigate interference (e.g., communicating in a same frequency band according to a paired carrier multiple access protocol, a multiplexed channel sharing protocol, or another interference mitigation protocol).

Figure 3:
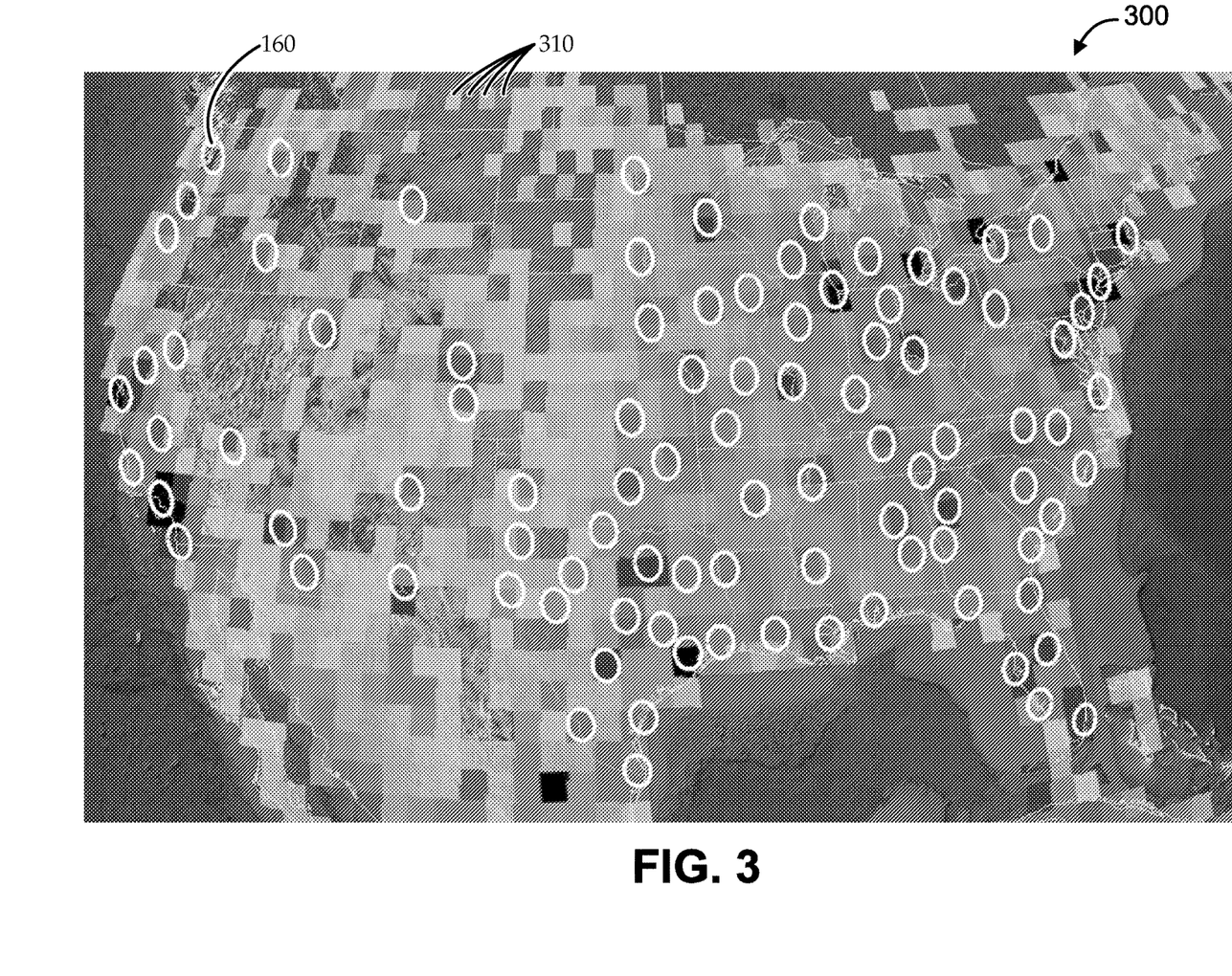
FIG. 3 shows an illustrative coverage map of the continental United States having a number of candidate coverage zones.

FIG. 3 shows an illustrative coverage map 300 of the continental United States having a number of candidate coverage zones 310. The candidate coverage zones 310 are shaded to represent respective consumption demand scores. As described above, the consumption demand scores can be computed to indicate an estimated consumption demand, an estimated presently unserved consumption demand, etc. As illustrated, fixed spot beams illuminate eighty coverage areas 160, each covering one or more of the candidate coverage zones 310. The spot beam coverage areas 160 are intended to be geographically non-overlapping. In the illustrated coverage map 300, a large percentage of the population of the total satellite coverage area may be serviceable by fixed spot beams (e.g., 0.15-degree beamwidth spot beams), even though only a very small portion of the total satellite coverage area is within any spot beam coverage area 160.

Figure 4:
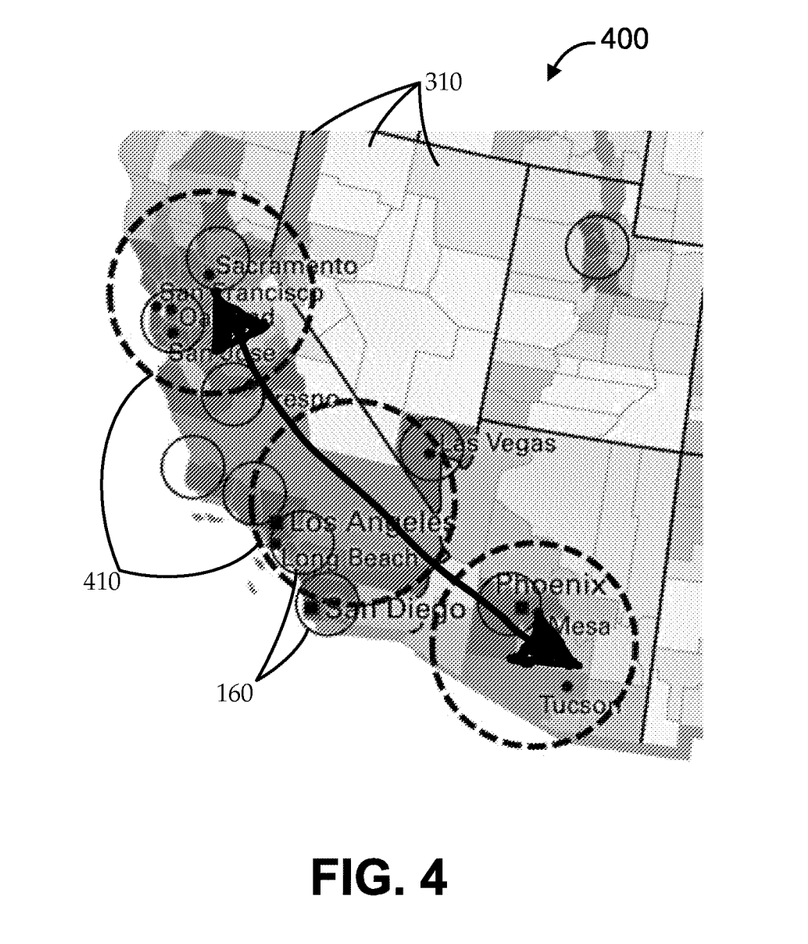
FIG. 4 shows a coverage map region, like a portion of the coverage map of FIG. 3, having a steerable user beam coverage area.

The coverage map 300 of FIG. 3 shows only fixed spot beams illuminating generally elliptically shaped coverage areas 160. FIG. 4 shows a coverage map region 400, like a portion of the coverage map 300 of FIG. 3, having a steerable user beam coverage area 410. As illustrated, the coverage map region 400 includes a number of candidate coverage zones 310, some of which being covered by fixed spot beam coverage areas 160. Additionally, a steerable user beam coverage area 410 can be pointed (mechanically, by beamforming, etc.) to cover portions of the coverage map region 400. As shown, the steerable user beam coverage area 410 can be pointed to overlap candidate coverage zones 310 also covered by a fixed spot beam, or the steerable user beam coverage area 410 can be pointed to cover candidate coverage zones 310 not covered by any fixed spot beam. For example, the steerable user beam coverage area 410 can be used to provide coverage to regions not otherwise covered, to add capacity to regions temporarily or permanently, and/or for any other suitable purpose. In FIG. 4, in any particular position, the steerable user beam coverage area 410 is shown as larger than any of the fixed user beam coverage areas 160. In other implementations, the steerable user beam coverage areas 410 can be any suitable size (e.g., the same size as, or smaller than, the fixed user beam coverage areas 160). In certain implementations, beamforming and/or other techniques can be used to adjust the size of the steerable user beam coverage areas 410, as desired.

Figure 5:
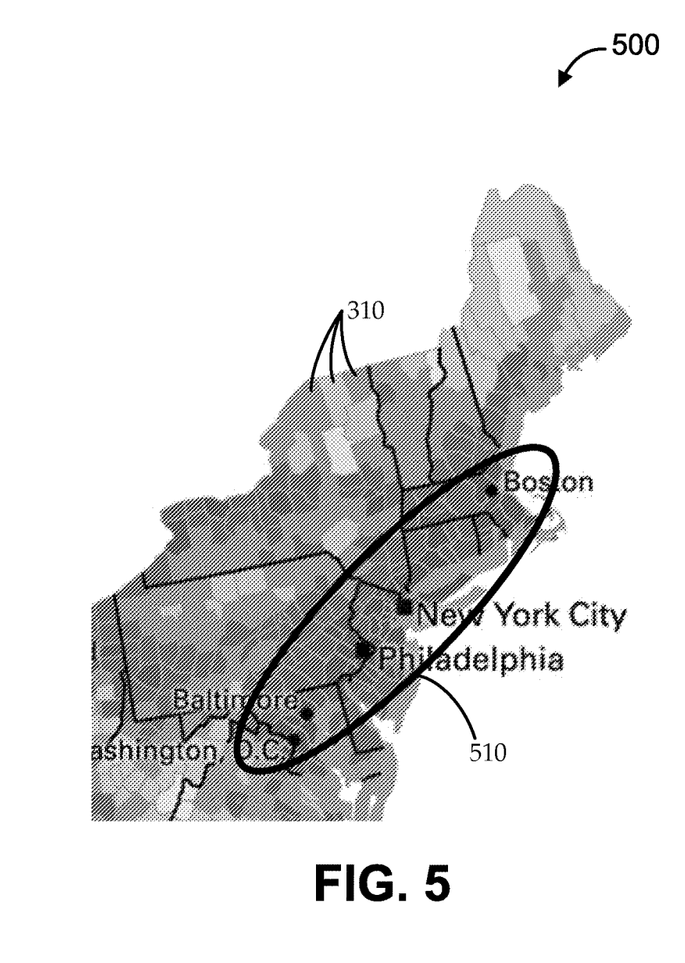
FIG. 5 shows a coverage map region, like a portion of the coverage map of FIG. 3, having a contoured beam coverage area.

In addition to steering beams, some embodiments can include features for contouring (e.g., shaping) beams. FIG. 5 shows a coverage map region 500, like a portion of the coverage map 300 of FIG. 3, having a contoured beam coverage area 510. The contoured beam coverage area 510 can be one of the fixed spot beam coverage areas 160. For example, an array of feeds can be configured to act as a single antenna element to produce a fixed spot beam that is shaped to cover multiple candidate coverage zones 310. Such a technique can be used to shape a coverage area, for example, to follow a natural border (e.g., a coastline or mountain range), political border (e.g., state line, country border, etc.), regulatory border, etc., or for any other suitable purpose.

Figure 6:
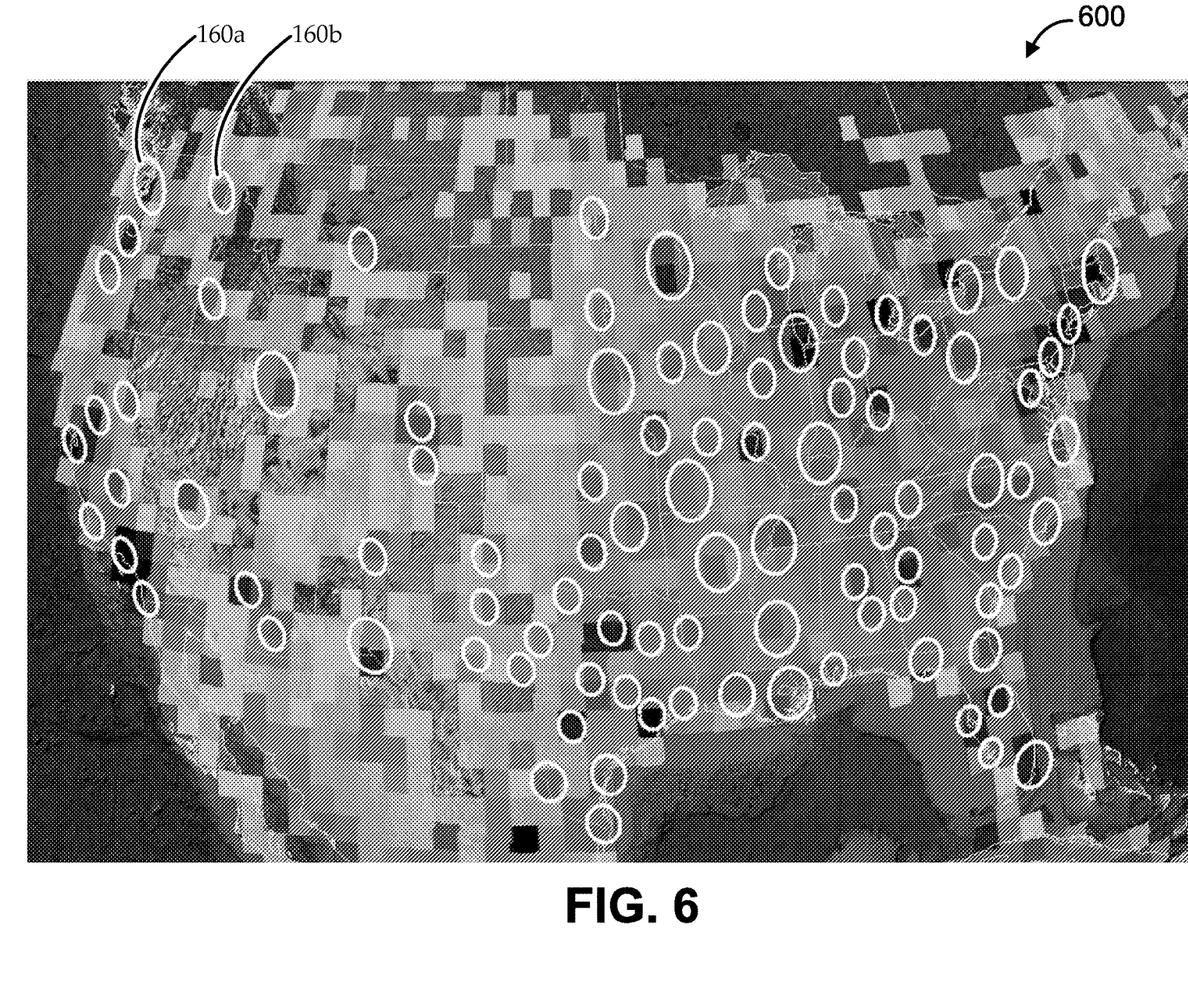
FIG. 6 shows an illustrative coverage map of the continental United States having a beam coverage areas of differing sizes.

FIGS. 3-5 describe various implementations of beams, including implementations having fixed beams all of the same size (e.g., all having the same beamwidth), implementations having fixed and steerable beams, implementations having contoured beams, etc. FIG. 6 shows an illustrative coverage map 600 of the continental United States having fixed beams with differing sizes. For example, one or more larger beams (such as fixed spot beam coverage area 160*a*) can be used in areas where population is more spread out (e.g., less geographically concentrated), and each larger beam can be sufficiently separated from other beams, so as to avoid interference from adjacent beams. Smaller beams (such as fixed spot beam coverage area 160*b*) can be used in areas where population is more dense (e.g., more geographically concentrated), and/or where other smaller beams are in close proximity. The illustrated beam map shows spot beams having beamwidths of 0.15, 0.2, and 0.25 degrees, though other beamwidths (and/or more or fewer than three beamwidths) can be used). While a second order effect, capacity is somewhat higher as beam size decreases (due to increased antenna gain). Hence, in some situations, it may be preferable to use a small beam in a dense population area (that may result in high demand), even though some portions of the population will be unserved by the system as the high demand will likely result in the beam filling up anyway (e.g., for a beam covering all or part of New York or Los Angeles). In other situations, a larger beam, even though it has lower capacity, may be more preferable, due to the relatively spread-out demand (e.g., for a beam covering Springfield, Illnois, or Evansville, Ind.). Differing beam sizes can be produced from the same-sized reflector by adjusting the illumination taper provided by the individual feeds. Alternatively, different reflectors or other techniques can be used to produce beams of differing sizes.

Figure 7:
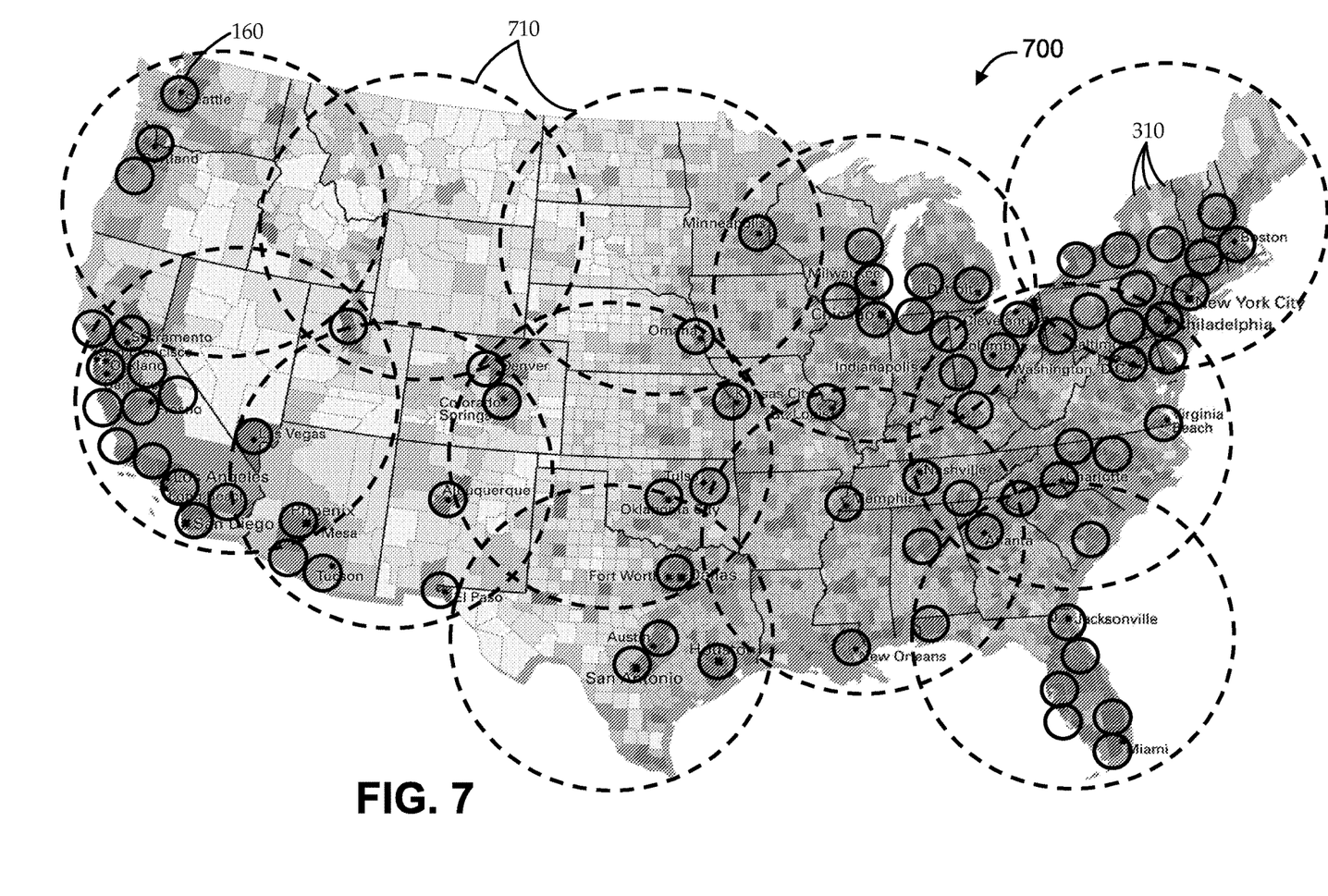
FIG. 7 shows an illustrative coverage map of the continental United States having a number of candidate coverage zones already serviced by existing infrastructure.

As described above, in some cases, embodiments can be deployed in regions already being serviced by other infrastructure. FIG. 7 shows an illustrative coverage map 700 of the continental United States having a number of candidate coverage zones 310 already serviced by existing infrastructure. The large beam coverage areas 710 (dashed lines) are illustrative of large satellite spot beams providing contiguous coverage over the entire region of the coverage map 700, and the smaller coverage areas (solid lines) are the fixed spot beam coverage areas 160 of embodiments described herein. As an example, the large beam coverage areas 710 may provide broad, contiguous coverage with lower throughput (e.g., 100 Gigabits per second); while the smaller fixed spot beam coverage areas 160 can provide sparse (non-contiguous) coverage with appreciably higher throughput (e.g., one Terabit per second).

Figure 8:
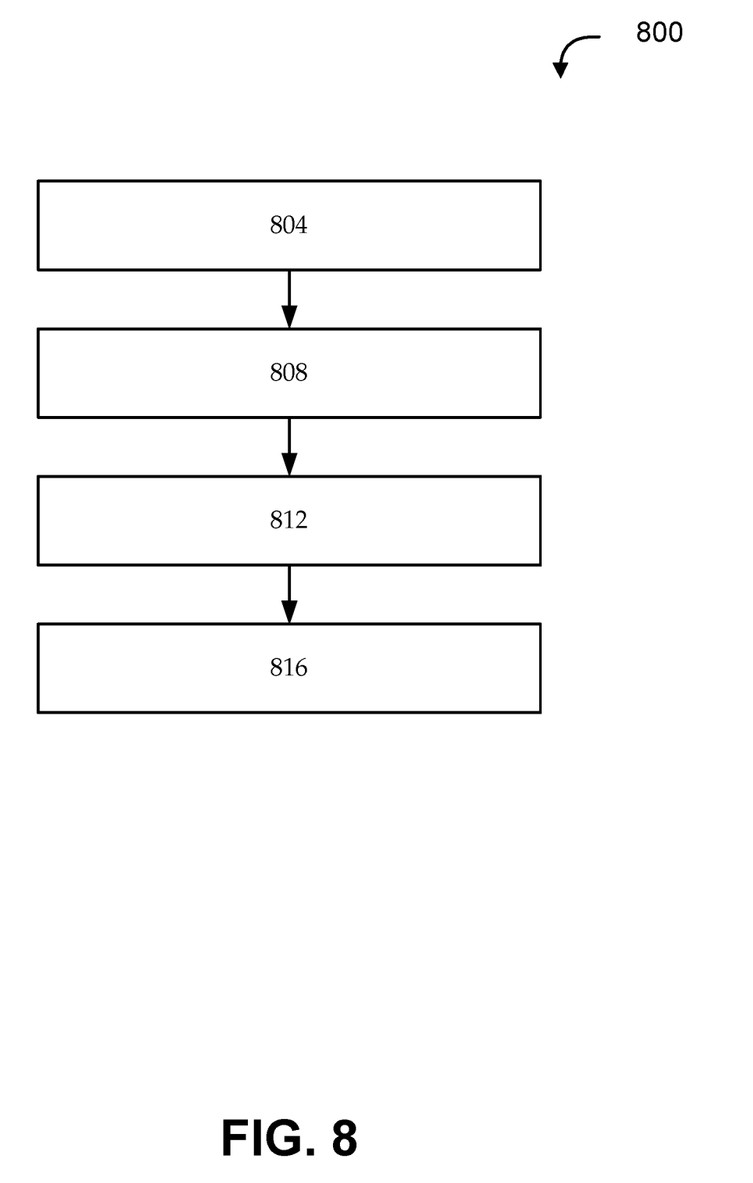
FIG. 8 shows a flow diagram of an illustrative method for providing satellite communications services in geographically non-overlapping beam coverage areas, according to various embodiments.

FIG. 8 shows a flow diagram of an illustrative method 800 for providing satellite communications services in geographically non-overlapping beam coverage areas, according to various embodiments. Embodiments of the method 800 begin at stage 804 by segmenting a coverage area of a geostationary satellite into multiple candidate coverage zones. At stage 808, embodiments can determine a consumption demand associated with each candidate coverage zone. At stage 812, embodiments can assign multiple fixed spot beams to a first subset of the candidate coverage zones according to highest associated consumption demands. The assigning at stage 812 can be performed such that each fixed spot beam corresponds to at least one candidate coverage zone of the first subset to service an associated user beam coverage area that is geographically non-overlapping with user beam coverage areas of all the other fixed spot beams. The assigning at stage 812 can also be performed such that each fixed spot beam is allocated full use of a same user-link spectrum. At stage 816, one or more steerable spot beams can be assigned to selectively cover a second subset of the plurality of candidate coverage zones.

The methods disclosed herein include one or more actions for achieving the described method. The method and/or actions can be interchanged with one another without departing from the scope of the claims. In other words, unless a specific order of actions is specified, the order and/or use of specific actions can be modified without departing from the scope of the claims.

In describing the present invention, the following terminology will be used: The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" means quantities, dimensions, sizes, formulations, parameters, shapes and other characteristics need not be exact, but can be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations including, for example, tolerances, measurement error, measurement accuracy limitations and other factors known to those of skill in the art, can occur in amounts that do not preclude the effect the characteristic was intended to provide. Numerical data can be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but also include individual values and sub-ranges within the indicated range. Thus, included in this numerical range are individual values such as 2, 3 and 4 and sub-ranges such as 1-3, 2-4 and 3-5, etc. This same principle applies to ranges reciting only one numerical value (e.g., "greater than about 1") and should apply regardless of the breadth of the range or the characteristics being described. A plurality of items can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items can be used alone or in combination with other listed items. The term "alternatively" refers to selection of one of two or more alternatives, and is not intended to limit the selection to only those listed alternatives or to only one of the listed alternatives at a time, unless the context clearly indicates otherwise. The term "coupled" as used herein does not require that the components be directly connected to each other. Instead, the term is intended to also include configurations with indirect connections where one or more other components can be included between coupled components. For example, such other components can include amplifiers, attenuators, isolators, directional couplers, redundancy switches, and the like. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples. As used herein, a "set" of elements is intended to mean "one or more" of those elements, except where the set is explicitly required to have more than one or explicitly permitted to be a null set.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein can be utilized. Accordingly, the appended claims include within their scope such processes, machines, manufacture, compositions of matter, means, methods, or actions.

What is claimed is:

1. A method for providing satellite communications services in beam coverage areas, the method comprising:
segmenting a coverage area of a geostationary satellite into a plurality of candidate coverage zones;
determining a consumption demand associated with each of the plurality of candidate coverage zones;
assigning a plurality of fixed spot beams of the geostationary satellite to a first subset of the plurality of candidate coverage zones according to highest associated consumption demands,
such that each fixed spot beam of the plurality of fixed spot beams corresponds to at least one candidate coverage zone of the first subset to service an associated user beam coverage area that is geographically non-overlapping with user beam coverage areas of all other fixed spot beams of the plurality of fixed spot beams, such that each fixed spot beam of the plurality of fixed spot beams is allocated full use of a same user-link spectrum; and assigning a steerable spot beam to selectively cover a second subset of the plurality of candidate coverage zones, wherein:

determining the consumption demand comprises computing a demand certainty score associated with each candidate coverage zone of the plurality of candidate coverage zones;

assigning the plurality of fixed spot beams is to the first subset of the plurality of candidate coverage zones having associated demand certainty scores exceeding a score threshold; and the steerable spot beam is one of a plurality of steerable spot beams, each assigned to selectively cover a respective subset of the plurality of candidate coverage zones having associated demand certainty scores below the score threshold.

2. The method of claim 1, wherein the assigning the plurality of fixed spot beams is such that each fixed spot beam is associated with a beam power to service the associated beam coverage area, an aggregate of all the associated beam powers supportable by a predetermined total power of the geostationary satellite.

3. The method of claim 2, wherein the assigning the plurality of fixed spot beams comprises maximizing a served consumption demand per serving power, the served consumption demand computed according to the determined consumption demands, and the serving power computed according to the associated beam powers.

4. The method of claim 3, wherein the served consumption demand per serving power is computed in served bits per second per Watt.

5. The method of claim 1, wherein the coverage area of the geostationary satellite is substantially coextensive with an aggregate of the plurality of candidate coverage zones.

6. The method of claim 1, wherein each user beam coverage area is associated with a same beam power.

7. The method of claim 1, wherein each fixed spot beam of the plurality of fixed spot beams is associated with a respective beam power computed to service the consumption demand associated with the corresponding at least one candidate coverage zone of the fixed spot beam.

8. The method of claim 1, wherein at least one of the user beam coverage areas is elliptical.

9. The method of claim 1, wherein assigning the plurality of fixed spot beams comprises shaping at least one of the user beam coverage areas to service multiple corresponding candidate coverage zones of the plurality of candidate coverage zones.

10. The method of claim 1, wherein each fixed spot beam of the plurality of fixed spot beams has a 3 dB beamwidth between about 0.1 and 0.2 degrees.

11. The method of claim 1, wherein the plurality of fixed spot beams comprises at least eighty fixed spot beams.

12. The method of claim 1, wherein the steerable spot beam is mechanically steerable to selectively cover the plurality of candidate coverage zones.

13. The method of claim 1, wherein the steerable spot beam is steerable by a phased array of antenna elements.

14. The method of claim 1, further comprising:

setting the score threshold to result in assigning a predetermined ratio of fixed spot beams to steerable spot beams.

15. The method of claim 1, wherein the same user-link spectrum has a bandwidth that is one of 1.4 GHz, 2 GHz, or 3.5 GHz.

16. The method of claim 15, wherein the bandwidth is in the Ka band.

17. The method of claim 15, wherein an aggregate capacity across all the fixed spot beams is at least 700 Gigabits per second for a modulation format achieving 2 bits per second per Hertz.

18. The method of claim 15, wherein an aggregate capacity across all the fixed spot beams is at least one Terabit per second for a modulation format achieving 2 bits per second per Hertz.

19. The method of claim 1, wherein each of the plurality of fixed spot beams is configured as a loopback beam to service a gateway terminal and a plurality of user terminals in the associated user beam coverage area.

20. The method of claim 19, wherein:

the gateway terminal communicates in a first frequency band that is different from the user-link spectrum.

21. The method of claim 20, wherein:

the first frequency band is in the V band; and the user-link spectrum is in the Ka band.

22. The method of claim 19, wherein the gateway terminal communicates in the same user-link spectrum, and the gateway terminal and user terminals use a paired carrier multiple access protocol.

23. The method of claim 19, wherein the gateway terminal communicates in the same user-link spectrum, and the gateway terminal and user terminals use a multiplexed channel sharing protocol.

24. The method of claim 1, wherein the first subset of the plurality of candidate coverage zones and the second subset of the plurality of candidate coverage zones are disjoint.

25. The method of claim 1, wherein at least one of the plurality of candidate coverage zones is within the first subset of the plurality of candidate coverage zones and within the second subset of the plurality of candidate coverage zones.

26. The method of claim 1, wherein all of the second subset of the plurality of candidate coverage zones are within the first subset of the plurality of candidate coverage zones.

* * * * *